United States Patent
Amm et al.

(10) Patent No.: US 9,658,698 B2
(45) Date of Patent: *May 23, 2017

(54) USING MEASUREMENT OF LATERAL FORCE FOR A TRACKING INPUT DEVICE

(71) Applicant: Apple Inc., Cupertino, CA (US)

(72) Inventors: David T. Amm, Sisters, OR (US); Omar S. Leung, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 119 days.

This patent is subject to a terminal disclaimer.

(21) Appl. No.: 14/718,278

(22) Filed: May 21, 2015

(65) Prior Publication Data

US 2015/0253866 A1    Sep. 10, 2015

Related U.S. Application Data

(63) Continuation of application No. 12/233,478, filed on Sep. 18, 2008, now Pat. No. 9,041,650.

(51) Int. Cl.
*G06F 3/033*  (2013.01)
*G06F 3/01*   (2006.01)
*G06F 3/0354* (2013.01)

(52) U.S. Cl.
CPC .......... *G06F 3/017* (2013.01); *G06F 3/03543* (2013.01)

(58) Field of Classification Search
None
See application file for complete search history.

(56) References Cited

U.S. PATENT DOCUMENTS

| | | | |
|---|---|---|---|
| 5,805,137 | A  | 9/1998  | Yasutake |
| 5,999,169 | A  | 12/1999 | Lee |
| 6,184,865 | B1 | 2/2001  | Zimmerman et al. |
| 6,489,948 | B1 | 12/2002 | Lau |
| 6,515,651 | B1 | 2/2003  | Berstis |
| 6,693,625 | B2 | 2/2004  | Armstrong |
| 6,975,302 | B1 | 12/2005 | Ausbeck, Jr. |
| 7,075,527 | B2 | 7/2006  | Takagi et al. |
| 7,154,477 | B1 | 12/2006 | Hotelling et al. |
| 7,176,889 | B2 | 2/2007  | Baker et al. |
| 2004/0080494 | A1 | 4/2004 | Fahlman |
| 2004/0130532 | A1 | 7/2004 | Gordon et al. |
| 2006/0274042 | A1 | 12/2006 | Krah et al. |
| 2007/0146325 | A1 | 6/2007 | Poston et al. |
| 2008/0167832 | A1 | 7/2008 | Soss |
| 2010/0013768 | A1 | 1/2010 | Leung |
| 2010/0073292 | A1 | 3/2010 | Amm et al. |
| 2015/0253866 | A1 | 9/2015 | Amm et al. |

OTHER PUBLICATIONS

Hinckley et al., "Quantitative Analysis of Scrolling Techniques," CHI 2002 Conference on Human Factors in Computing Systems, CHI Letters, vol. 4, No. 1, pp. 65-72.

*Primary Examiner* — Adam R Giesy
(74) *Attorney, Agent, or Firm* — Brownstein Hyatt Farber Schreck, LLP

(57) ABSTRACT

Systems and methods for using measurements of a lateral force applied to a motion-based input device are disclosed. The input device has a force detection module operable to detect lateral forces applied to the input device and generate force data representative of the applied lateral forces. The system also includes a processor coupled to the force detection module. The processor is operable to initiate an event based upon the force data.

20 Claims, 3 Drawing Sheets

USING MEASUREMENT OF LATERAL
FORCE FOR A TRACKING INPUT DEVICE

This application is a continuation of U.S. patent application Ser. No. 12/233,478, entitled "Using Measurement of Lateral Force for a Tracking Input Device", filed on filed Sep. 18, 2008, which is incorporated by reference in its entirety as if fully disclosed herein.

FIELD OF THE INVENTION

The invention relates to input devices for computing systems, and more particularly, to a method and apparatus for using force sensors for generating input data.

BACKGROUND OF THE INVENTION

An input device can be manipulated by a user to generate input data in a computer system. Typically, an input device is positioned on a surface and moved relative to that surface, but other forms of input devices operating in different fashions are also available. The operations performed on an input device generally correspond to moving a cursor and/or making selections on a display screen. There are many kinds of electronic input devices, such as buttons or keys, pens, digitizing pads, game controllers, trackballs, touch screens, touch pads, mice, and the like. A "mouse" is a common type of input device that functions as a pointing device for a computer by detecting motion imparted by a user. The mouse's motion is typically translated into motion of a navigational object (e.g., cursor) on a graphical user interface (GUI) provided on a display screen. A mouse generally comprises a small case, held in a user's hand, with one or more input buttons. Additionally, a mouse may have other elements, such as a scroll wheel, that allow a user to perform enhanced operations.

Many types of input devices, such as a mouse, are only capable of generating a limited amount of input. For example, most conventional mouse input devices generate two types of input data: i) input data generated from sensing movement of the mouse relative to a surface; and ii) input data generated from a user depressing a selection button and/or scrolling a scroll wheel on the mouse. Accordingly, the manner and type of input data that can be generated using conventional devices is limited.

SUMMARY OF THE INVENTION

Various aspects of the present invention relate to systems and methods for initiating actions (i.e. events) on a receiving device, such as a personal computer, using an input device. A system in accordance with one embodiment includes an input device. The input device has a motion detection module operable to generate motion data representative of a motion of the input device and a force detection module operable to generate force data representative of a force acting upon the input device. The system also includes a processor coupled to the motion detection module and the force detection module. The processor is operable to receive the motion data and force data, and initiate an event based upon the motion data and the force data.

In accordance with another embodiment, a method for tracking movement of a motion-based input device is provided. The method includes measuring a lateral force acting upon the motion-based input device, selecting an event based upon the measured lateral force, and initiating the event.

A system according to one embodiment includes a motion-based input device and a processor. The motion-based input device includes a force detection module operable to detect a lateral force applied to the input device and generate lateral force data indicative of the detected lateral force. The processor is coupled to the force detection module and is operable to receive the force data and calculate an estimated direction of motion of the input device based on the force data. The system further includes a display displaying a graphical user interface having a cursor, wherein the system moves the cursor on the graphical user interface in accordance with the estimated direction of motion.

Certain embodiments of the invention have other aspects in addition to or in place of those mentioned or obvious from the above. The aspects will become apparent to those skilled in the art from a reading of the following detailed description when taken with reference to the accompanying drawings.

BRIEF DESCRIPTION OF THE DRAWINGS

The following drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DETAILED DESCRIPTION OF EXEMPLARY EMBODIMENTS

In the following description of exemplary embodiments, reference is made to the accompanying drawings which form a part hereof, and in which it is shown by way of illustration specific embodiments in which the invention can be practiced. It is to be understood that other embodiments can be used and structural changes can be made without departing from the scope of the invention.

In accordance with various embodiments, a motion-based input device can include one or more force sensors capable of detecting forces acting upon the input device and generating data representative of the detected forces. A system can then initiate (e.g., trigger) one or more events based on the data representative of the detected forces.

As used herein, the term "event" can refer to any function or process performed by a computer system in response to user input. An event need not be a function traditionally initiated by a user using a motion-based input device, but can also include functions initiated by a user using other types of input devices, including keyboards, touch pads, switches, buttons, dials or any other electrical, mechanical and/or optical mechanism that generates input data in response to a user input. A few non-limiting examples of an event can include moving a cursor displayed on a graphical user interface, making a selection indication (e.g., similar to depressing a selection button on a mouse, for example), changing a mode of operation, turning volume up or down, changing channels, paging back and forth in a software application, initiating a startup or wakeup sequence of a receiving device or the input device, and increasing a data collection rate to decrease lag.

As used herein, a motion-based input device can refer to an input device that detects multi-directional motion of the input device relative to a surface. Motion-based input devices can utilize a variety of sensors for detecting movement of the input device relative to a surface and generate an input signal indicating information pertaining to the detected movement. Non-limiting examples of motion-based input devices include electro-mechanical mice (also known as "ball mice"), optical mice and inertial mice (e.g., accelerometer-based mice).

As user herein, the term "module" refers to any unit or combination of units incorporating software, firmware, hardware, or any combination thereof that is designed and configured to perform a desired function. In addition, the term "module" does not imply that the components or functionality described or claimed as part of the module are all configured in a common package. Indeed, any or all of the various components of a module, whether control logic or other components, can be combined in a single package or separately maintained and can further be distributed across multiple locations.

Figure 1:
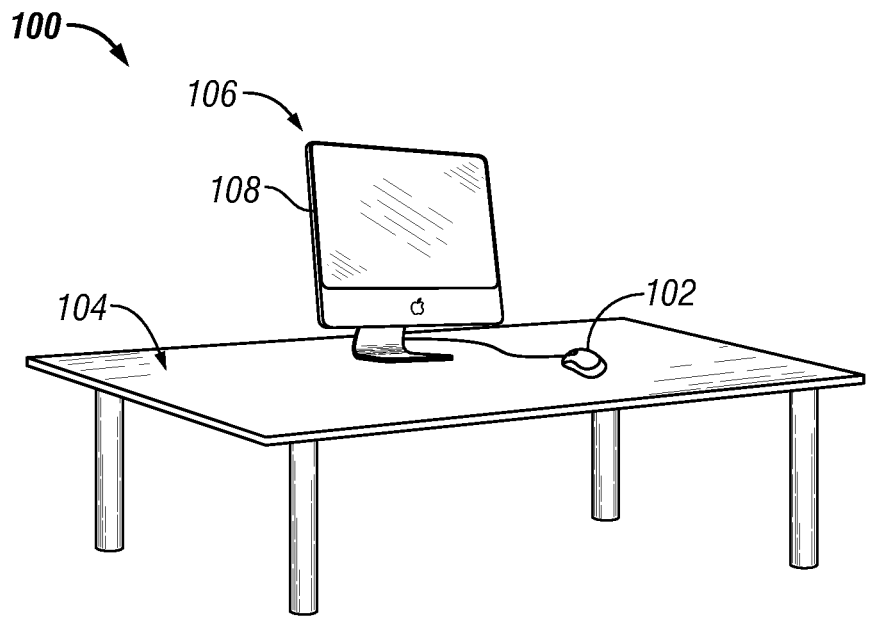
FIG. 1 illustrates an exemplary computing system using an input device according to one embodiment of this invention.

FIG. 1 illustrates a typical environment or system 100 in which an input device 102 may be used in accordance with one embodiment of the invention. The motion-based input device 102 can be positioned upon a surface 104 such as a desk or a tabletop. In order to generate input data, a user can move the input device 102 relative to the surface 104 to generate input signals indicative of the movement of the input device.

Note that in FIG. 1, the surface 104 is depicted as being flat or substantially flat. However, this is not necessary according to other embodiments. Also note that the surface 104 need not necessarily be situated beneath the input device 102. For example, the surface 104 may be tilted, situated above the input device 102, or vertically oriented. Also note that multiple surfaces 104 can be utilized.

A receiving device 106 can be adapted to receive input signals generated by the input device 102. As used herein, the terms "receiving device" and "receiver" include without limitation video game consoles, set-top boxes, televisions, personal computers (whether desktop, laptop, or otherwise), digital video recorders, communications equipment, terminals, and display devices. In accordance with various embodiments, the receiving device 106 can comprise at least one interface adapted to receive input signals transmitted from the input device 102. The device 102 can be physically coupled to the receiving device via one or more communication links (such as via a serial bus cable) or the input device 102 can be adapted to wirelessly communicate with the receiving device 106.

A display device 108 in communication with the receiving device 106 can be adapted to display a navigational object upon its display screen (for example, a pointer, cursor, selector box, or other such indicator). During operation, when the user manipulates the input device 102 relative to the surface 104, input signals generated by the input device 102 are received at the receiving device 106 and the navigational object responds according to the user's input. As used herein, the term "display device" can include any type of device adapted to display information, including without limitation cathode ray tube displays (CRTs), liquid crystal displays (LCDs), thin film transistor displays (TFTs), digital light processor displays (DLPs), plasma displays, light emitting diodes (LEDs) or diode arrays, incandescent devices, and fluorescent devices. Display devices may also include less dynamic devices such as printers, e-ink devices, and other similar structures.

Figure 2:
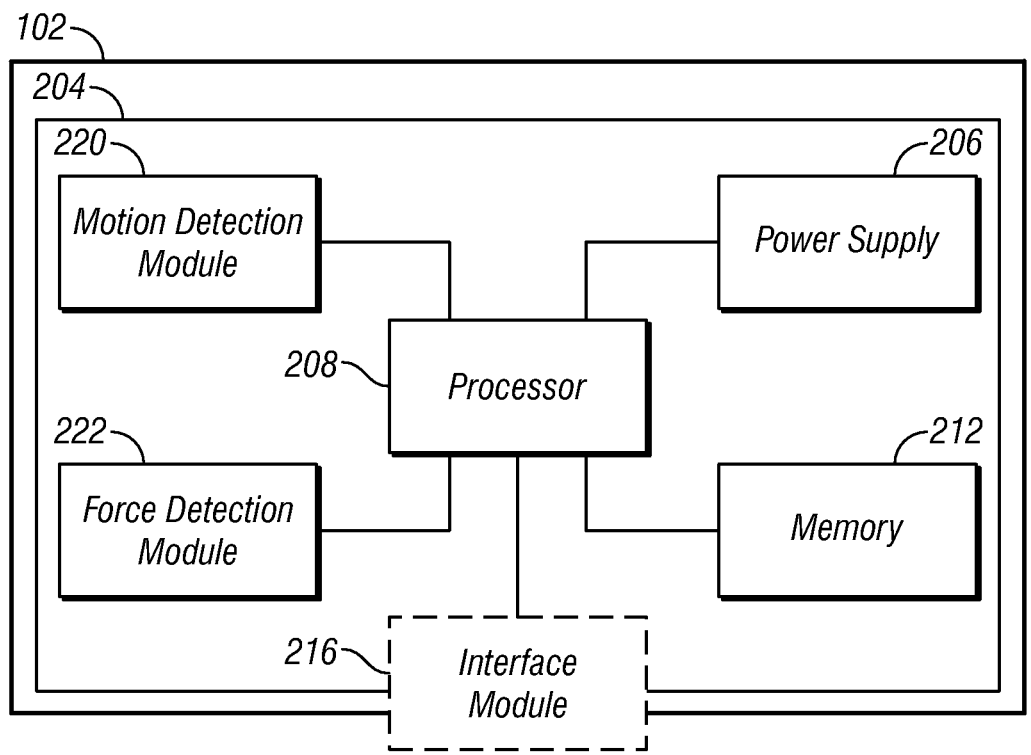
FIG. 2 is a system diagram of a modular arrangement of an input device according to one embodiment of this invention.

FIG. 2 is a system diagram of a modular arrangement of the input device 102 according to one embodiment of the present invention. The input device 102 includes a printed circuit board 204 comprising electrical leads that enable various modules to communicate with other coupled modules.

A power supply 206 provides a source of power to modules electrically coupled to the printed circuit board 204. In some embodiments, power is supplied externally from one or more conductive wires, for example, through the use of a power cable or a serial bus cable. In other embodiments, a battery may be used as a source of power.

A memory 212 comprises any type of module adapted to enable digital information to be stored, retained, and retrieved. Additionally, the memory 212 may comprise any combination of volatile and non-volatile storage devices, including without limitation RAM, DRAM, SRAM, ROM, and/or flash memory. Note also that the memory 212 may be organized in any number of architectural configurations, through the use of registers, memory caches, data buffers, main memory, mass storage, and/or removable media, for example.

One or more processors 208 can be adapted to execute sequences of instructions by loading and storing data to the memory 212. Possible instructions include, without limitation, instructions for data conversions, formatting operations, communication instructions, and/or storage and retrieval operations. Additionally, the processors 208 may comprise any type of digital processing devices including, for example, reduced instruction set computer processors, general-purpose processors, microprocessors, digital signal processors, gate arrays, programmable logic devices, reconfigurable compute fabrics, array processors, and/or application-specific integrated circuits. Note also that the processors 208 may be contained on a single unitary integrated circuit die or distributed across multiple components.

An interface module 216 enables data to be transmitted and/or received over one or more data networks. The data can be transmitted or received wirelessly or through the use of wires. In an exemplary embodiment, data transmitted to a receiving device is first packetized and processed according to one or more standardized network protocols. In some embodiments, the interface module 216 comprises a plurality of network layers such that each layer provides services to the layer above it and receives services from the layer below it. The interface module 216 may accommodate any wired or wireless protocol including, without limitation, USB, FireWire, Ethernet, Gigabit Ethernet, MoCA, radio frequency tuners, modems, WiFi, Blutooth, WiMax, and/or Infrared Data Association.

A motion detection module 220 comprises logic adapted to determine a speed, velocity, acceleration and/or position of the input device 102 at a specific instant in time, or alternatively, over a period of time. In accordance with various embodiments, the motion detection module 220 can include one or more motion detection sensors to determine acceleration from a plurality of sensed external forces acting upon the input device 102. The motion detection sensors can be, for example, one or more accelerometers. In further embodiments, the motion detection module 220 can include different types of sensors, such as optical sensors and/or electro-mechanical sensors.

In one embodiment, the motion detection module 220 can detect sliding noise and/or vibrational signals resulting from the input device 102 kinetically contacting the surface 104. In one embodiment, when the input device 102 slides across surface 104, the motion detection module 220 can record data contained within one or more response spectrums. This data can be used to derive additional information about the motion of the input device 102, as described in more detail in applicant's U.S. patent application Ser. No. 12/235,326, filed on Sep. 22, 2008, and titled "Using Vibration to Determine the Motion of an Input Device", the content of which is incorporated by reference herein in its entirety for all purposes.

A force detection module 222 can include sensors and logic adapted to detect forces acting upon the input device 102 during an instant in time, or alternatively, over a period of time. In accordance with some embodiments, the force detection module can include one or more force detection sensors operable to detect external forces acting upon the input device 102. In some embodiments, the force detection module 220 can detect forces acting upon the input device 102 in at least two dimensions (e.g., at least along an x-axis and a y-axis in a Cartesian coordinate system).

As mentioned above, the input device 102 can include one or more force sensors. In one embodiment, a three-component force sensor can detect the forces exerted on the input device in three dimensions (e.g., along x, y and z axes in a Cartesian coordinate system). Suitable three-component force sensors include Kistler 3-Component Force Sensors, models 9167A. 9168A, 916AB, or 9168AB, offered by Kistler North America located in Amherst, N.Y., USA. In other embodiments, separate force sensors can be used to detect the forces exerted on the input device 102.

Figure 3:
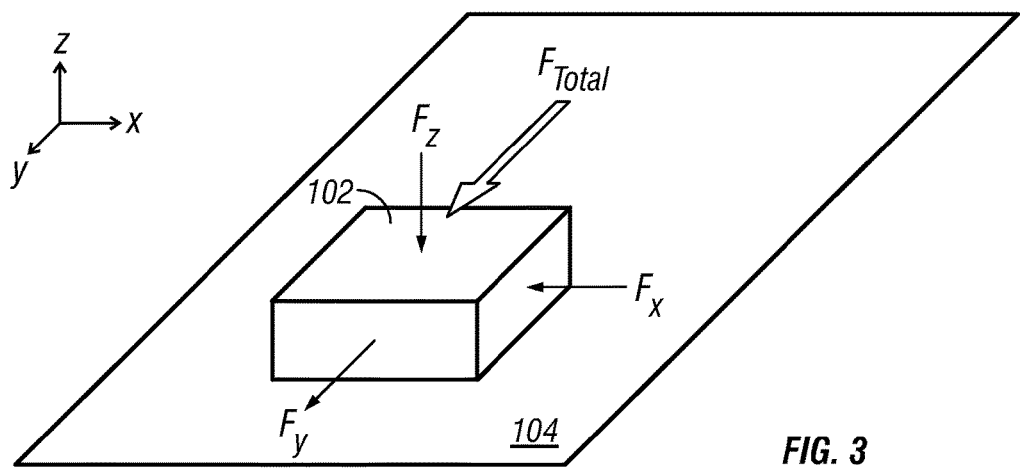
FIG. 3 is a block diagram of forces exerted on an input device according to one embodiment of this invention.

In accordance with one embodiment, directions and magnitudes of forces acting upon the input device 102 can be derived from information generated by the force sensors. FIG. 3 is a block diagram indicating a force $F_{total}$ applied to the input device 102 positioned on surface 104. As an example, the force $F_{total}$ may be applied to the input device 102 by a user to move the input device in a desired direction in a plane of motion. As used herein, a "plane of motion" can be defined as an x-y plane in a Cartesian coordinate system in which a user moves the input device 102. The x-y plane has an x-axis and a y-axis perpendicular to the x-axis. A z-axis extends perpendicularly from the x-y plane. In one embodiment, the x-y plane is parallel to the surface 104 on which the input device 102 is placed.

As depicted in FIG. 3, the force $F_{total}$ applied to the input device can comprise a lateral force component and a normal force component (the normal force can also be referred to as a vertical force). The lateral force component further includes a first lateral force component, Fx, in a direction along the x-axis, and a second lateral force, Fy, component in a direction along the y-axis. The normal force component, Fz, is in a direction along the z-axis.

The direction of the lateral force is mathematically related to the lateral force components, Fx and Fy, applied to the input device 102 in the plane of motion. This relationship can be expressed as:

$$|F|=\sqrt{(Fx^2+Fy^2)} \quad (1)$$

Where |F| is a total magnitude of the lateral force component applied to the input device 102. Corresponding directional vectors can then be derived using the following expression:

$$X \text{ direction}=Fx/|F|, Y \text{ direction}=Fy/|F| \quad (2)$$

Thus, using measurements of the lateral force components, Fx and Fy, applied to the input device 102, logic residing in force detection module 220 or computer 106, for example, can estimate a total magnitude of the lateral force and corresponding directional unit vectors of the lateral force. Of course, other standard techniques known in physics may be used to calculate a scalar quantity of force from a given set of force vectors. In accordance with various embodiments, the logic may be implemented as any combination of software, firmware and/or hardware.

In one embodiment, motion and force information is written to a memory 212 within input device 102 before being provided as input to receiving device 106. In other embodiments, this data can be stored in external memory (e.g. a hard drive of the receiving device 102) wherein the input device 102 simply transmits raw data to the receiving device 106 for storage and processing by one or more processors (not shown) in the receiving device.

As mentioned above, one or more force sensors 222 can be utilized to generate force information pertaining to forces acting upon the input device 102. In accordance with one embodiment, the input device 102 can detect lateral components of forces applied to the input device 102 in two directions in a plane of motion of the input device; the first direction being substantially perpendicular to the second direction. Information relating to the detected lateral force components can then be used to calculate an estimated magnitude and direction of a lateral force acting upon the input device 102, among other things. A system in accordance with various embodiments can then initiate an event based on the estimated magnitude and direction, for example.

Figure 4:
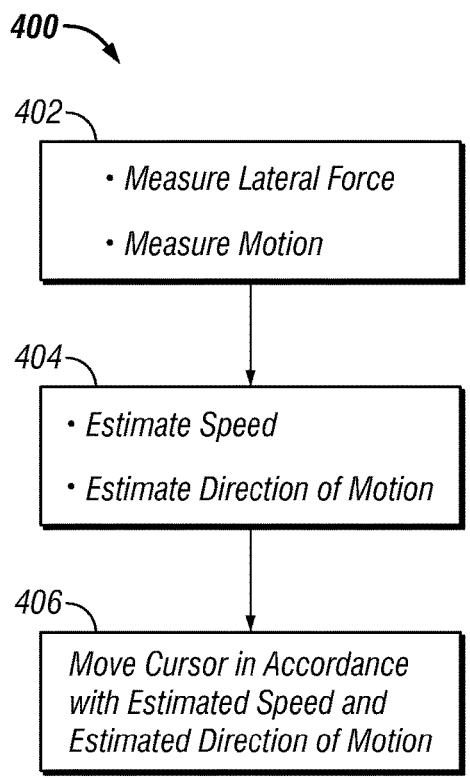
FIG. 4 is an exemplary process for estimating a direction of motion of an input device based upon detected lateral forces according one embodiment of this invention.

FIG. 4 is flow diagram illustrating an exemplary process 400 of estimating a direction of motion of an input device based upon detected lateral forces, in accordance with one embodiment. The various tasks performed in connection with process 400 may be performed by hardware, software, firmware, or any combination thereof. It should be appreciated that process 400 may include any number of additional or alternative tasks. The tasks shown in FIG. 4 need not be performed in the illustrated order and process 400 may be incorporated into a more comprehensive procedure or process having additional functionality not described in detail herein. For illustrative purposes, the following description of processes may refer to elements mentioned above in connection with FIGS. 1-3.

Process 400 begins at step 402 when an input device 102 detects a lateral force (or lateral components of a force) acting upon the input device 102 in the x-y plane of motion and a motion of the input device. The lateral force is detected using one or more force sensors incorporated in the input device 102. The motion of the input device can be measured by a variety of sensors, such as by one or more accelerometers. The force sensors and motion detection sensors also generate data values indicative of the detected lateral force and motion, respectively. These data values can include values of lateral force components measured along an x-axis and y-axis, respectively, in a Cartesian coordinate system. The lateral force and motion data values can be stored in memory 212 for later processing or sent directly to processor 208, for example. As mentioned above, in alternative embodiments, raw data generated by the force sensors and motion sensors can be sent directly to an external memory for subsequent processing by processing circuitry (not shown) within the receiving device 106.

Next, at step 404, an estimated direction of motion of the input device 102 and an estimated speed of the input device are calculated using the lateral force and motion measurements, respectively, measured at step 402.

At step 406, a cursor displayed on a graphical user interface is moved in accordance with the estimated direction of motion and estimated speed of the input device. For example, a cursor displayed on a graphical user display may be moved in a direction corresponding to the estimated direction of motion and with a speed that is in proportion to the estimated speed.

Figure 5:
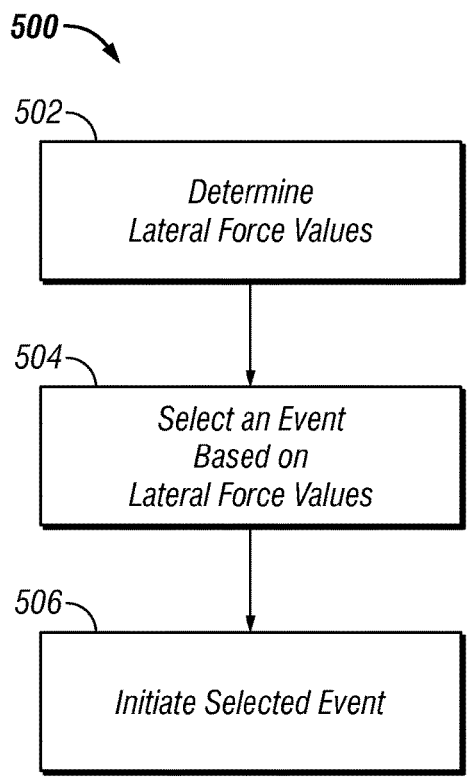
FIG. 5 is a flow diagram illustrating an exemplary process for initiating events based upon the measured lateral forces and other conditions according to one embodiment of this invention.

FIG. 5 is flow diagram illustrating an exemplary process 500 of initiating an event based upon detected lateral forces, in accordance with one embodiment. The various tasks performed in connection with process 500 may be performed by hardware, software, firmware, or any combination thereof. It should be appreciated that process 500 may include any number of additional or alternative tasks. The tasks shown in FIG. 5 need not be performed in the illustrated order and process 500 may be incorporated into a more comprehensive procedure or process having additional functionality not described in detail herein. For illustrative purposes, the following description of processes may refer to elements mentioned above in connection with FIGS. 1-3.

Process 500 begins at step 502 when an input device 102 detects a lateral force (or lateral components of a force) acting upon the input device 102 in the x-y plane of motion. The input device 102 incorporates one or more force sensors to detect the lateral force and generates data values indicative of the detected lateral force. These data values can include values of lateral force components measured along an x-axis and y-axis, respectively, in a Cartesian coordinate system, for example. These values can be stored in memory 212 for later processing or sent directly to processor 208, for example. As mentioned above, in alternative embodiments, raw data generated by the force sensors can be sent directly to an external memory for subsequent processing by processing circuitry (not shown) within the receiving device 106.

Next, at step 504, an event or one of a plurality of possible events is selected based upon the lateral force values generated in step 502. As a non-limiting example, a first event is selected in step 504 if the lateral force values indicate that the lateral force acting upon the input device 102 is directed predominantly along the x-axis in the plane of motion; whereas a second event is selected in step 504 if the lateral force values indicate that the lateral force is directed predominantly along the y-axis in the plane of motion. In one embodiment, the first event can correspond to a "single click" performed on a traditional mouse and the second event can correspond to a "double-click" performed on a traditional mouse. Of course other methods of selecting an event based upon the lateral force values can be used, and the above is merely one example.

Finally, the event selected in step 504 is initiated in step 506. As described above, the event can be any number of possible functions or processes. It may also be noted that various additional conditions or variations can be implemented in process 500. Some of the conditions and variations are described below.

In one embodiment, initiation of one or more events based on a detected force can depend upon whether the input device 102 is moving or not moving (i.e. stationary). For example, in one exemplary implementation, initiation of an event based on a detected lateral force occurs if it is determined that the input device 102 is not moving at that time. In further embodiments, a second, different event is initiated based on the detected force if it is determined that the input device 102 is moving.

In one embodiment a polarity of the lateral force in the plane of motion determines which event is initiated. For example, a first event may be initiated if it is determined that the lateral force measured along a first axis in the plane of motion has a positive value (e.g., if the lateral force component measured along the x-axis is has a positive value), lateral force measured along a first axis in the plane of motion has a negative value (e.g., if the lateral force component measured along the x-axis is has a negative value).

Moreover, in one embodiment, an event is initiated if an estimated magnitude of the lateral force is greater than a predetermined threshold. In this manner, small, unintentional forces exerted by a user on the input device 102 need not be taken into account.

Further, in one embodiment, measuring an increase or a reduction in magnitude of force exerted on the input device 102 over a given period of time can initiate one or more events.

Figure 6:
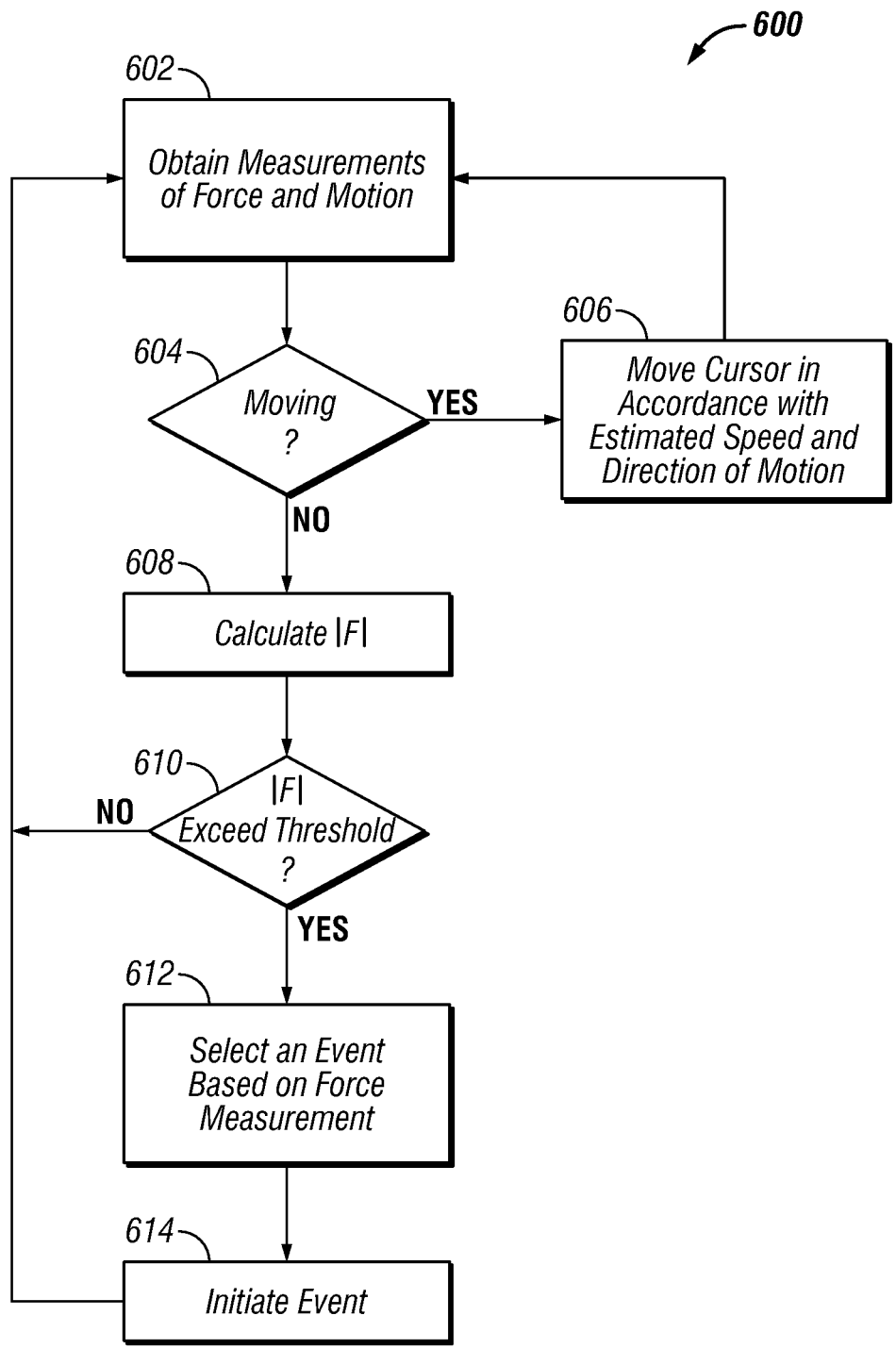
FIG. 6 is a flow diagram illustrating an exemplary process for initiating an event based upon the measured lateral forces and motion imparted on the input device according to one embodiment of this invention.

FIG. 6 is a flow diagram illustrating an exemplary process 600 for initiating an event based upon measured lateral forces and motion imparted on the input device 102 in accordance with one embodiment. The various tasks performed in connection with process 600 may be performed by hardware, software, firmware, or any combination thereof. It should be appreciated that process 600 may include any number of additional or alternative tasks. The tasks shown in FIG. 6 need not be performed in the illustrated order and process 600 may be incorporated into a more comprehensive procedure or process having additional functionality not described in detail herein. For illustrative purposes, the following description of process 600 may refer to elements mentioned above in connection with FIGS. 1-3.

At step 602, lateral force data and movement data are generated by force sensors and motion sensors, respectively, residing in motion detection module 220. The lateral force data are indicative of a lateral force imparted on the input device 102 and the movement data are indicative of a motion of the input device 102. The lateral force and movement data values can be stored in memory 212 for processing by processor 208 or sent directly to the receiving device 106 for storage and processing. In one embodiment, the motion detection module includes one or more accelerometers adapted to detect acceleration forces applied to the input device 102.

Based upon the movement data values, at step 604, it is determined whether the input device 102 is moving. If it is determined that the input device 102 is moving, then a cursor or other graphical object associated with the input device 102 is moved based on the lateral force data and movement data obtained at step 606. In one embodiment, the movement data is generated by one or more accelerometers that can measure an acceleration of the input device 102. An estimated speed of the device can be calculated by logic adapted to integrate the measured acceleration. In addition, an estimated direction of motion can be calculated by logic adapted to apply equations (1) and (2), above, using the force data. The estimated speed and the estimated direction of motion can then be used to move a cursor on a display in proportion to the estimated speed and in accordance with the estimated direction of motion, for example. The process then returns to step 602.

If it is determined that the input device 102 is not moving at step 604, then, at step 608, process 600 calculates a force magnitude |F| based on the magnitude of the lateral forces measured during step 602.

The force magnitude |F| is then compared with a predetermined threshold at step 610. The predetermined threshold can be selected based upon a desired sensitivity of the input device 102. In other words, a relatively large threshold value can require a large lateral force to be exerted on the input device 102 in order to initiate an event; whereas a small lateral force can initiate an event when a relatively smaller threshold value is used. In accordance one embodiment, the threshold value can be selected based upon user preference. If the force magnitude is less than the threshold value, then the process 600 returns to step 602 and the process 600 is repeated.

However, if the force magnitude is greater than the threshold, then the process 600 selects an event based on the detected lateral forces in step 612 and initiates the selected event in step 614. A variety of factors or comparisons can be used when selecting the event based on the detected lateral forces in step 612. For example, a first event may be selected based on whether the lateral force component measured along the x-axis is greater than the lateral force component measured along the y-axis. In other words, a first event is selected if the lateral force applied along the x-axis is greater than the lateral force applied along the y-axis. Whereas, a second event is selected if the lateral force measured along the x-axis is less than the lateral force measured along the y-axis. As another example, an event can be selected based on whether an estimated lateral force magnitude or a measured lateral force component is determined to be increasing at a specific instant in time or over a period of time.

While this invention has been described in terms of several exemplary embodiments, there are alterations, permutations, and equivalents, which fall within the scope of this invention. For example, the term "computer" does not necessarily mean any particular kind of device, combination of hardware and/or software, nor should it be considered restricted to either a multi purpose or single purpose device.

It should also be noted that there are many alternative ways of implementing the methods and apparatuses of the present invention. It is therefore intended that the following appended claims be interpreted as including all such alterations, permutations, and equivalents as fall within the true spirit and scope of the present invention. In addition, as used herein, the terms "computer program" and "software" can refer to any sequence of human or machine cognizable steps that are adapted to be processed by a computer. Such may be rendered in any programming language or environment including, for example, C/C++, Fortran, COBOL, PASCAL, Perl, Prolog, assembly language, scripting languages, markup languages (e.g., HTML, SGML, XML, VoXML), functional languages (e.g., APL, Erlang, Haskell, Lisp, ML, F# and Scheme), as well as object-oriented environments such as the Common Object Request Broker Architecture (CORBA), Java™ (including J2ME, Java Beans, etc.).

Moreover, terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. An electronic device comprising: a motion sensor operable to generate motion data representative of a motion of the electronic device; a force sensor operable to generate force data representative of a force applied to the electronic device; and a processing unit, coupled to the motion sensor and the force sensor, operable to: receive the motion data and force data; determine whether the electronic device is moving based upon the motion data; if the electronic device is moving, initiate a first event based upon the motion data and the force data; and if the electronic device is not moving, initiate a second event based upon the force data.

2. The electronic device of claim 1, wherein the processing unit selects the first event from a plurality of events.

3. The electronic device of claim 2, wherein the processing unit selects a first of the plurality of events as the first event if the force is applied predominantly directed along a first axis and a second of the plurality of events as the first event if the force is applied predominantly directed along a second axis.

4. The electronic device of claim 3, wherein the first of the plurality of events and the second of the plurality of events are related events.

5. The electronic device of claim 1, wherein the processing unit selects the second event from a plurality of events.

6. The electronic device of claim 5, wherein the processing unit selects a first of the plurality of events as the second event if the force is applied predominantly directed along a first axis and a second of the plurality of events as the second event if the force is applied predominantly directed along a second axis.

7. The electronic device of claim 6, wherein the first of the plurality of events and the second of the plurality of events are related events.

8. A system for initiating events, comprising a first electronic device, comprising: a motion sensor operable to generate motion data representative of a motion of the first electronic device; and a force sensor operable to generate force data representative of a force applied to the first electronic device; and a second electronic device, communicably coupled to the first electronic device, operable to:

receive the motion data and force data from the first electronic device; determine whether the first electronic device is moving based upon the motion data; if the first electronic device is moving, initiate a first event based upon the motion data and the force data; and if the first electronic device is not moving, initiate a second event based upon the force data.

9. The system of claim 8, wherein the second electronic device selects a first of a plurality of events as the first event if the force is below a threshold and a second of the plurality of events as the first event if the force is above the threshold.

10. The system of claim 9, wherein the first of the plurality of events comprises determining not to perform a function the second of the plurality of events comprises determining to perform the function.

11. The system of claim 9, wherein the threshold is based upon a user preference.

12. The system of claim 8, wherein the second electronic device selects a first of a plurality of events as the second event if the force is below a threshold and a second of the plurality of events as the second event if the force is above the threshold.

13. The system of claim 12, wherein the first of the plurality of events comprises determining not to perform a function the second of the plurality of events comprises determining to perform the function.

14. A method for initiating events, comprising: measuring a force, utilizing a force sensor, applied to an electronic device; measuring a motion, utilizing a motion sensor, of the electronic device; determine whether the electronic device is moving based upon the measured motion; if the electronic device is moving, initiating a first event based upon the measured motion and the measured force; and if the electronic device is not moving, initiating a second event based upon the measured force.

15. The method of claim 14, wherein the first event is:
a first of a plurality of events if the force is applied along a first axis greater than along a second axis; and
a second of the plurality of events if the force is applied along the second axis greater than along the first axis.

16. The method of claim 14, wherein the second event is:
a first of a plurality of events if the force is applied along a first axis greater than along a second axis; and
a second of the plurality of events if the force is applied along the second axis greater than along the first axis.

17. The method of claim 14, wherein the first event is:
a first of a plurality of events if the force is increasing; and
a second of the plurality of events if the force is not increasing.

18. The method of claim 14, wherein the second event is:
a first of a plurality of events if the force is increasing; and
a second of the plurality of events if the force is not increasing.

19. The method of claim 14, wherein said operation of measuring the force comprises measuring forces applied to the electronic device in at least two directions utilizing at least two force sensors.

20. The method of claim 14, wherein the first event comprises moving a navigational object on a graphical display:
in accordance with an estimated speed determined based at least on the measured motion; and
in a direction in which the force is applied determined based at least on the measured force.

* * * * *